United States Patent
Pengg et al.

(10) Patent No.: US 8,720,509 B2
(45) Date of Patent: May 13, 2014

(54) TENSION DEVICE FOR A NONSKID CHAIN

(75) Inventors: Agyd Pengg, Klagenfurt (AT); Georg Grossauer, Deutschlandsberg (AT)

(73) Assignee: Pewag Schneeketten GmbH & Co KG, Graz (AT)

( * ) Notice: Subject to any disclaimer, the term of this patent is extended or adjusted under 35 U.S.C. 154(b) by 149 days.

(21) Appl. No.: 13/272,855

(22) Filed: Oct. 13, 2011

(65) Prior Publication Data
US 2012/0090751 A1 Apr. 19, 2012

(30) Foreign Application Priority Data
Oct. 14, 2010 (AT) .................................. 1714/2010

(51) Int. Cl.
B60C 27/10 (2006.01)

(52) U.S. Cl.
USPC ...... 152/219; 152/217; 242/384.7; 242/396.4

(58) Field of Classification Search
USPC .......... 152/170, 185, 213 A, 213 R, 216, 217, 152/218, 219, 231; 24/68 TT, 909; 242/382, 242/384.7, 396.4, 385.4
See application file for complete search history.

(56) References Cited

U.S. PATENT DOCUMENTS

| 6,213,421 | B1 * | 4/2001 | Franklin | 242/384.7 |
| 6,293,485 | B1 * | 9/2001 | Hollowed | 242/385.3 |
| 7,900,670 | B2 * | 3/2011 | McCauley et al. | 152/219 |
| 7,963,306 | B2 * | 6/2011 | McCauley et al. | 152/219 |
| 8,166,616 | B2 * | 5/2012 | Pengg | 24/68 TT |
| 8,322,389 | B2 * | 12/2012 | McCauley et al. | 152/219 |

FOREIGN PATENT DOCUMENTS

EP 1935674 A1 6/2008

* cited by examiner

Primary Examiner — Kip T Kotter
(74) Attorney, Agent, or Firm — Design IP

(57) ABSTRACT

In a tension device for a nonskid chain, a winding reel is supported, so that it can rotate about its axis inside the housing and is prestressed in the winding direction and has a gear rim with teeth arranged along its circumference. A tension line that can be retracted into the housing can be connected to the winding reel, such that a ratchet in a first position blocks a rotational movement of the winding reel in the tension direction by engagement of the ratchet in the teeth. Areas free of teeth on the circumference of the gear rim of the winding reel alternate with areas with teeth.

12 Claims, 3 Drawing Sheets

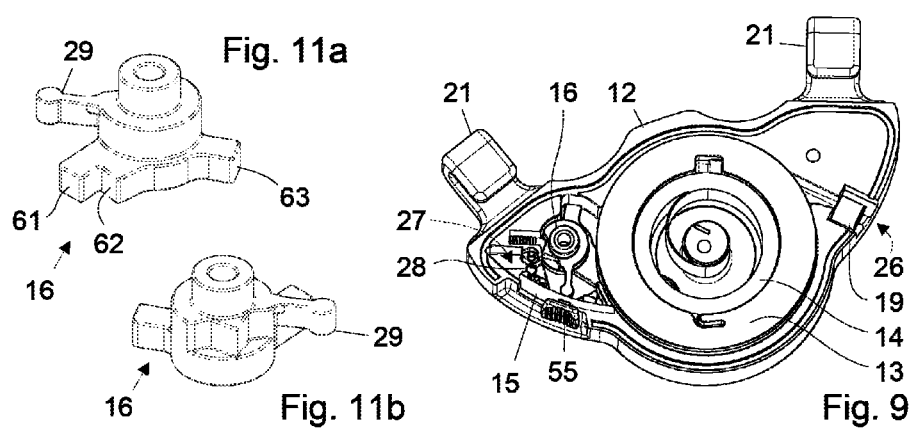
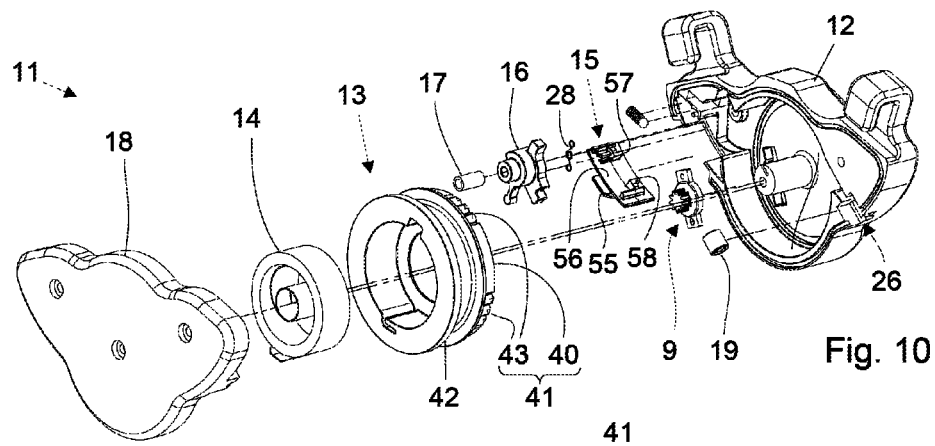
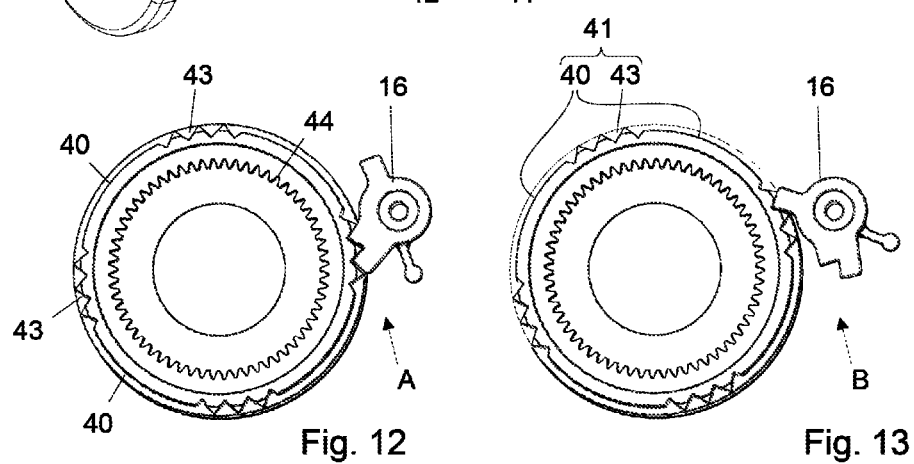

TENSION DEVICE FOR A NONSKID CHAIN

CROSS REFERENCE TO RELATED APPLICATIONS

This application claims priority from Austrian Patent Application Serial No. A 1714/2010, filed on Oct. 14, 2010.

BACKGROUND OF THE INVENTION

The invention relates to a tension device for a nonskid chain having a housing, a winding reel and a ratchet allocated to the latter; the winding reel is mounted to rotate about its axis inside the housing and is prestressed in the winding direction; it has a gear rim with teeth arranged along its circumference; a tension line that can be retracted into the housing through a housing opening can be connected to the winding reel, such that in a first position, the ratchet blocks the rotational movement of the winding reel in the tension direction by engaging the ratchet in the teeth of the gear rim.

Tension devices are used with nonskid chains, in particular snow chains, to prevent unwanted unreeling of the tension line after assembly. The tension line is usually a tension cable but may also be embodied as a tension chain, for example. The tension devices considered here are used primarily on trucks or heavy vehicles but may essentially be used with any type of vehicles having wheels.

European Patent No. EP 1 935 674 A1 describes a tension device of the type defined in the introduction. A tension line that can be retracted into the housing through a housing opening is connected to a winding reel, which is prestressed in the winding direction and is mounted to rotate about its axis inside the housing. The winding reel has a gear rim, which is connected in a rotationally fixed manner and in which a ratchet engages, thereby blocking the movement of the gear rim either in the winding direction or in the opposite direction, depending on the position of the ratchet.

With these tension devices, it has been found that the nonskid chain on the vehicle wheel can result in damages when the chain is installed too tightly on the wheel. For example, when the nonskid chain migrates around the wheel—which occurs especially at higher speeds—this movement of a chain in close contact with the wheel can lead to abrasion and damage to the tire. This is the case on truck tires in particular because these problems are greatly intensified there in comparison with nonskid chains/snow chains on passenger vehicles due to the larger dimensions and greater weight of the tires and the greater load on them. On the other hand, the chain should be held with a certain force when mounted on the wheel, so that the chain sits well on the wheel and cannot slip laterally.

One object of the invention is therefore to create a tension device which will overcome the disadvantages mentioned above. In particular, a certain play should be possible in tightening the chain.

SUMMARY OF THE INVENTION

This object is achieved by a tension device of the type defined in the introduction, with which at least one area free of teeth and situated between teeth that follow it is formed on the circumference of the gear rim of the winding reel according to the invention.

This approach fulfills the object simply and nevertheless effectively. Because of the tooth-free sections, the winding reel may also yield even in the blocked state by a certain amount, which corresponds approximately to the length of the section. As soon as the ratchet reaches a toothed section in the course of this yielding, a further rotation of the winding reel and thus further yielding in the tension direction are blocked. As a result, the nonskid chain can be put under tension in larger increments than would correspond to a single toothing pitch. This yields a greater play in applying tension to the chain and ensures that the nonskid chain will sit loosely enough on the tire without causing damage. Furthermore, the slight sag in the chain provides a self-cleaning effect with respect to soiling caused by mud, snow or the like due to the mobility of the chain.

In an advantageous further embodiment of the invention, the toothed areas and tooth-free areas alternate, so that the gear rim has at least two tooth-free areas—for example, three, four, five or six such areas—separating an equal number of areas, each having a uniform number of toothing pitches.

To permit simple unblocking of the cable blocking in assembly of the nonskid chain, an externally accessible operating member may be provided, acting on the ratchet via an arm, such that the arm of the actuating member is connected to the ratchet via an articulated length. This permits movement of the ratchet between the first position in which it blocks a rotational movement of the winding reel in the tension direction, and a second position in which this movement is enabled. Then the arm may be arranged beneath of the ratchet and may extend outside of the winding reel along a direction running around the winding reel (as seen in the direction of the axis of the winding reel). The articulated length is, for example, a mortise and tenon joint, which is formed by an opening and peg or tenon engaging in this opening provided on the arm and/or on the ratchet.

As an alternative to that, the actuating member may have two stop faces on the inside, which cooperate with one arm of the ratchet situated between the two stop faces and being tiltable by the stop faces, depending on the movement of the actuating member, such that as a result of this tilting movement the ratchet can be moved between the first position and the second position (wherein the movement in the tension direction is blocked or released).

To further simplify assembly, the second position of the ratchet may block more extensive refraction of the tension line in that the ratchet also acts on the gear rim in the second position, but a rotational movement of the winding reel in the winding direction is blocked by the engagement of the ratchet in the teeth.

Furthermore, a damping device may be provided, which has a wheel element connected by gears to the winding reel, presenting a braking action to counteract its rotation, at least in a direction corresponding to the winding direction of the winding reel, such that the wheel element is preferably a gear wheel, which cooperates with a gear rim, in particular an internal ring gear of the winding reel.

Furthermore, it is favorable if the tension device is provided with retaining elements, in particular hooks arranged on the housing; with these fastening means the tension device may be undisplaceably fastened to an outer line of the nonskid chain. The use of hooks also facilitates the fastening in that the tension device may be simply suspended on chain lengths of the outer line.

BRIEF DESCRIPTION OF THE DRAWINGS

The invention is explained together with its advantages and advantageous embodiments in greater detail below on the basis of nonrestrictive exemplary embodiments for inventive tension devices, which are used in a nonskid chain for trucks, for example, and are depicted in the accompanying drawings. The figures show:

FIG. 9 shows a tension device according to a second exemplary embodiment, illustrating the opened state in a first blocking position;

FIG. 10 shows the tension device of FIG. 9 in an exploded diagram;

FIG. 11a and FIG. 11b show the ratchet of the tension device of FIGS. 9 and 10, each showing a view of the inside and the outside;

FIG. 12 shows the first blocking position of the tension device of FIGS. 9 and 10 illustrated on the basis of the interaction of the ratchet and the winding reel; and FIG. 13 shows the second blocking position of the tension device of FIGS. 9 and 10 in a diagram similar to that shown in FIG. 12.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

Figure 6:
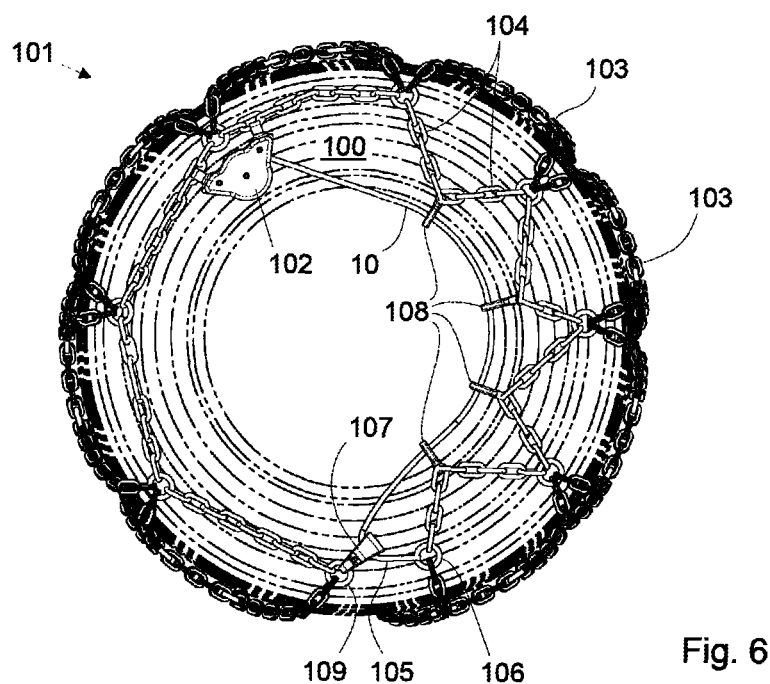
FIG. 6 shows a diagram of a nonskid chain mounted on a tire with the tension device according to the exemplary embodiment.

A nonskid chain 101, which works together with a tension device 102 according to the exemplary embodiments discussed below, is shown in the applied state on a tire 100 in FIG. 6. The tracking cross 103 of the chain 101 is bordered and held at the sides by an outer chain 104. To secure the chain 101 after it has been placed on the tire, the outer chain 104 is closed at its ends using a tension cable 10. The tension cable 10 is fastened at a first end, the end piece 105, to one end of the outer chain 104, for example, by being suspended from an end ring 106 on the outer chain. A second end of the tension cable 10 is held in the tension device 102, which is in turn fastened to the outer chain 104—typically in an area which is opposite the end of the chain on the tire. The tension cable 10 is typically a steel cable but it may also be implemented as a chain for a portion of the distance, for example, the end piece 105 of the tension cable may be designed as a chain with an end hook (not shown) such that the end hook is suspended in the end ring 106 of the outer chain. The tension cable 10 serves to contract the outer chain 104. For this purpose, a deflecting hook 107 is provided on the end piece 105 of the tension cable, while the tension cable 10 is connected with the help of a few guide rings 108 to the sections of the outer line situated in front of the end ring 106 (and at the same time is guided around the center of the wheel). The latter serves to close the chain 101 on the tire, which is achieved by suspending the deflecting hook on the opposite end 109 of the outer chain, e.g., on a chain length or preferably a ring. Due to the tension effect of the tension device 1, the ends of the outer line are pulled toward one another, so that the chain 101 is widened on the tire surface in the desired manner and the tracking crosses 103 on the tire tread surface are unfolded.

The tension cable 10 serves to contract the outer chain 104 and to put the chain 101 under tension on the tire 100 immediately after the chain has been applied. To this end, the tension cable 10 is connected to the sections of the outer line situated in front of the end ring 106 with the help of a few guide rings 108 and in this way is guided around the center of the tire, and a deflecting hook 107 is provided on the end piece 105 of the tension cable.

Figures 7A, 7B:
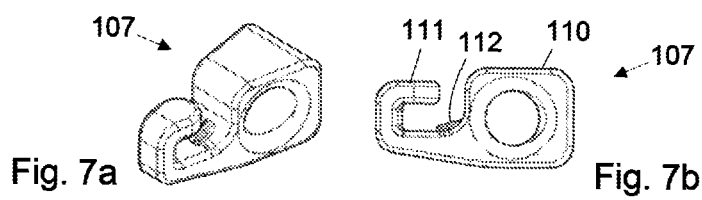
FIG. 7a and FIG. 7b each show a perspective view and a side view of the deflecting hook of the nonskid chain from FIG. 6.

FIGS. 7a and 7b illustrate as an example an embodiment of the deflecting hook 107 with which the tension cable 10 is connected to the opposite end 109 of the outer chain 104. The deflecting hook 107 is designed, for example, as a one-piece component made of glass fiber-reinforced plastic and has a ring-like body 110 with an eye through which the tension cable is guided and a hook part 111 arranged on the body 110, with which the deflecting hook 107 can be suspended in the outer chain end 109. A protrusion 112, e.g., in the form of a shallow protrusion, is provided on the attachment of the hook part 111. This causes the ring (or the chain length) on which the hook is suspended to be snapped into the hook part 111 and prevents the deflecting hook 107 from being released from the end 109 when the tension is to be released by the tension cable.

Figures 8A, 8B:
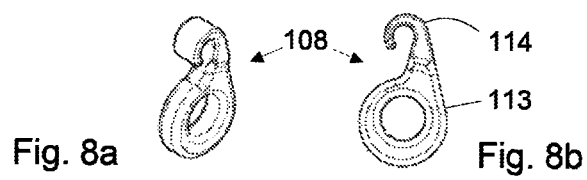
FIG. 8a and FIG. 8b each show a perspective view and a side view of a guide hook of the nonskid chain from FIG. 6.

FIGS. 8a and 8b illustrate as an example an embodiment of the guide rings 108. In a ring body 113 of the guide ring 108, an eye through which the tension cable is guided is formed, and a hook element 114 arranged on the ring body 113 enables suspension on the outer line 104 (cf. FIG. 6). The guide ring 108 is preferably designed as a one-piece component made of glass fiber-reinforced plastic.

Figures 1, 2:
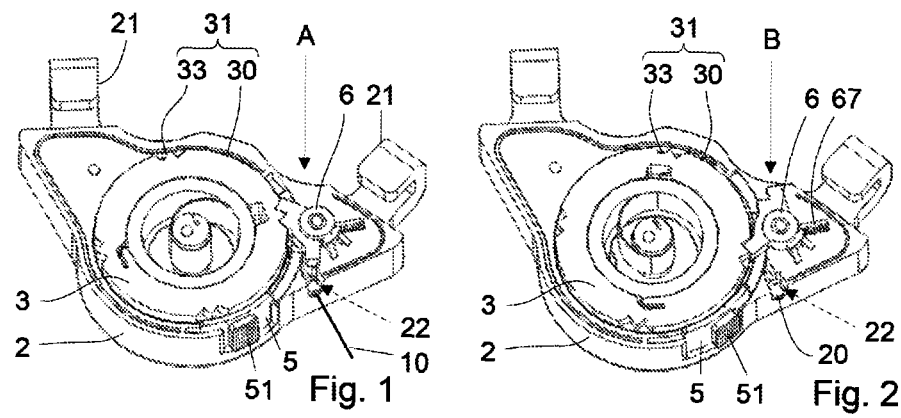
FIG. 1 is a tension device according to a first exemplary embodiment in an opened state (namely with the cover removed) in a first blocking position.
FIG. 2 shows the opened tension device from FIG. 1 in the second blocking position.
Figure 3:
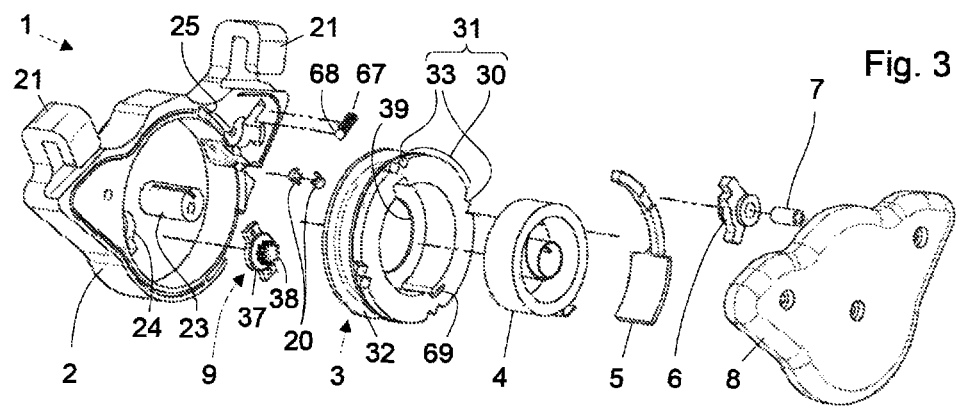
FIG. 3 shows the tension device from FIG. 1 in an exploded diagram.

An overview of the design of a tension device 1 according to a first exemplary embodiment is shown in FIGS. 1 to 3. The tension device 1 has a housing which is formed from two parts, for example, namely a housing bottom 2 and a cover 8 (the latter has been removed in FIGS. 1 and 2 to show the arrangement of the interior components). The housing parts 2 and 8 are fixedly joined together by riveting (not shown), for example. Retaining elements, e.g., in the form of hooks 21, which may be designed in one piece with the housing in the embodiments shown here, are provided on the housing, namely on the bottom part 2 here. The tension device may be fastened to an outer chain (or optionally another part) of the nonskid chain by means of the hooks 21, as already mentioned, usually by directly suspending the hooks in chain lengths of the outer chain, which permits an undisplaceable and yet releasable type of fastening. The hooks 21 are advantageously oriented toward the same side of the tension device 1 (for example, toward the front here) to facilitate their being suspended in the chain. For example, a hook 21 is formed on the upper narrow side of each of the two wing parts of the tension device 1. The tension cable 10 mentioned above runs through an opening 22 in the housing. The part of the tension cable 10 in the interior of the tension device 1 is rolled up onto a winding reel 3. The opening 22 may be reinforced by a sleeve 20, namely formed by two sleeve halves here, to resist wear due to the tension cable. The part of the tension cable 10 protruding out of the tension device is shown symbolically in FIG. 1, while the wound part is concealed beneath the upper edge of the winding reel. The tension cable is not shown in FIGS. 2 and 3.

The diagram of the tension device 1 illustrated in FIGS. 1 and 2 with the cover removed shows the winding reel 3 with a gear rim 31, which is arranged in the "front side" (i.e., on the side of the winding reel facing the observer in this diagram) in the embodiment shown here, and a ratchet 6, which cooperates with the gear rim. By means of an actuating member 5, which can be actuated via a button 51 embodied from another opening in the housing, it is possible to ascertain, as needed, in which desired direction the tension cable 10 is released, while at the same time a movement in the opposite direction is being blocked. Thus FIG. 1 shows position A ("driving operating position") in which the tension cable 10 can be retracted, whereas extraction of the cable (according to rotation of the winding reel in the tension direction) is blocked and can occur only over a small length of same. This position is used during operation of the nonskid chain 101, as illustrated in FIG. 6. However, FIG. 2 shows the position B ("assembly position") in which the tension cable 10 can be extracted, while retraction (winding) of the cable is blocked and can occur only over a short length. This assembly position is used in tightening the nonskid chain 101 on a tire 100 to allow the required length of the tension cable to be selected and not to be held constantly against the pretension of the winding reel while arranged on the wheel.

As can be seen in FIG. 3, the winding reel 3 has a body 32 which serves as a cable roll for winding up the tension cable 10 as well as a gear rim 31 connected to the former in a rotationally fixed manner and having teeth 33, which are described in greater detail below. The spring 4 is fastened to the cable roll (suspended in a recess 69 on the inside of the body 32) on the one hand and on the other hand to a central journal 23 of the housing bottom 2 and is prestressed in the winding direction. The spring 4 is a spiral spring, for example, and is shown in simplified form in the drawings.

Figures 4, 5:
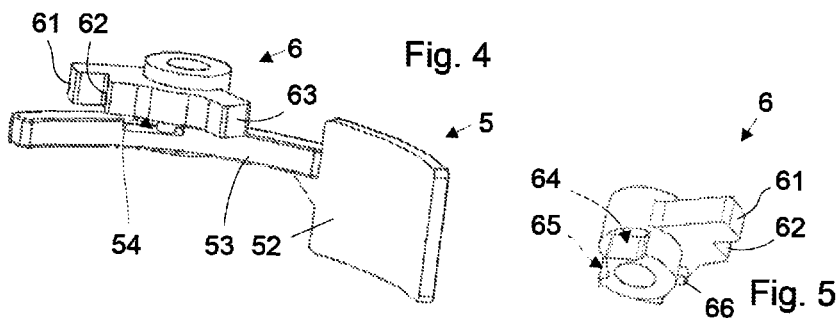
FIG. 4 shows a detailed view of the ratchet and the actuating button of the tension device of FIGS. 1 and 3.
FIG. 5 shows a view of the ratchet of FIG. 4 on the outside.

Again with reference to FIGS. 1 and 2, a ratchet 6 is arranged in the housing next to the gear rim 31 in one of the two wing parts of the tension device. The ratchet 6 is mounted inside the housing so that it can rotate about a guide sleeve 7 which is attached between the housing parts 2 and 8. The ratchet 6 has two positions A, B, each of which corresponds to a blocking position, as already mentioned, and can be adjusted with the actuating member 5. In each position, the ratchet may assume an end position in which the ratchet engages in the teeth 33 of the gear rim 31. In doing so, the teeth cooperate via one or more of the sloping surfaces 61, 62, 63 corresponding to the tooth flank of one type (namely with flanks oriented clockwise in FIG. 1 and with flanks oriented counterclockwise in FIG. 2) (FIG. 4) on the outside of the ratchet. The direction in which the cable roll can be moved while it is blocking in the respective opposite direction is defined by means of the ratchet 6. Both flanks of the teeth of the gear rim 31 are used for optionally inhibiting the cable movement. To do so, the teeth may be arranged symmetrically as in the embodiments shown here; this further simplifies the construction.

The ratchet advantageously has two or more sloping surfaces 61, 62, which are used in blocking the extraction of the cable. Each sloping surface here cooperates with each tooth flank of the gear rim 31. The use of two or more sloping surfaces in the driving operating position enlarges the area by means of which the force can be transferred and yields a better distribution of the acting forces. This increases the operating reliability of the tension device during use.

The ratchet 6 is held in the respective position A, B by a resilient retaining element 67. This retaining element at the same time ensures the required in the ratchet 6 to ensure the movement of the gear rim in the allowed direction. The retaining element 67 is designed, for example, as a spring (e.g., spiral spring) by means of which a ball 68 is pressed against the rear side of the ratchet 6 where there are two recesses 64, 65 (FIG. 5) each corresponding to one of positions A, B. The ratchet 6 can be switched between these two positions with the help of the actuating member 5.

In the movement of the tension cable in the allowed direction the gear rim 31 lifts the engaging sloping surface(s) 61, 62, 63 of the ratchet 6 slightly in each position of the tooth, springing back into the next interdental space due to the spring force of the retaining element 67 with further rotation of the gear rim 31 as soon as the next interdental space is reached. In the opposite direction from this, however, the movement is blocked in a self-locking manner because the gear rim is supported on the opposite face of the ratchet via the respective sloping surface(s) thereby inhibiting its movement.

According to the invention the gear rim 31 of the winding reel does not have teeth on its entire circumference but rather only in one or more circumferential sections 33. Teeth here are understood to refer to a structuring of their circumference by teeth and/or interdental spaces. Within the scope of this disclosure, a tooth is understood to be a structure protruding outward (i.e., away from the midpoint of the winding reel) with a flank oriented in the winding direction and another flank oriented in the tension direction, and an interdental space, an inwardly recessed structure (i.e., toward the midpoint), with a flank oriented in the winding direction and another flank oriented in the tension direction; two neighboring teeth with their facing halves form one interdental space and vice-versa. A tooth, i.e., an interdental space forms a unit of the dentition ("toothing pitch").

In at least one additional circumferential section 30 the gear rim is free of teeth, i.e., there is no structure there running in the circumferential direction (it is "smooth" or "toothless"; this does not rule out structuring in the direction parallel to the axis). In the embodiment shown here, for example, four sections 33 with teeth separated by four "smooth" sections 30 are provided. The sections 33 are advantageously arranged uniformly on the gear rim. The distance between the sections 33 with teeth (=extent of the "smooth" sections 30) may thus depend on the size of the gear rim. In this exemplary embodiment each toothed section 33 consists of two tooth pitches, namely two interdental spaces. In general the toothed section 33 correspond to one or more toothing pitches, where the number of toothing pitches preferably corresponds to the number of sloping surfaces 61, 62 (shaped according to the tooth flanks) which are used in the driving operating position A.

When the inventive tension device 1 is brought into the driving operating position according to FIG. 1 on a tire after tightening the nonskid chain 101, the tension cable 10 is retracted continuously until the outside chain 104 is under tension. The ratchet 6 is on a smooth section 30 in the tension device 1 here. If tension is not applied to the tension cable, the winding reel 3 may yield so that the ratchet 6 slides on the smooth section 30. This occurs until reaching a toothed section 33 in which the ratchet 6 then blocks any further rotation in the tension direction. The nonskid chain 101 may thus be stretched in larger increments than would correspond to a single toothing pitch. This yields a greater play in stretching the outside chain 104 and it ensures that the nonskid chain 101 will sit on the tire with sufficiently looseness without causing any damage. Nevertheless a rotational movement is blocked namely any yielding of the winding reel to the extent of more than one revolution and/or a part of a revolution corresponding to the extent of a toothless section.

As already mentioned, the ratchet 6 is switched between the two positions by means of the actuating member 5. According to FIG. 4 the actuating member consists of a plate 52 on which the button 51 is mounted (FIGS. 1 and 2) and an arm 53, the two together having a uniformly curved shaped. In the bottom part of the housing the actuating member 5 is inserted into a recess 25 which runs in a direction around the winding reel 3. The curved shape of the actuating member allows it to be moved back and forth in the recess 25 so that the plate 52 closes the opening in the housing toward the inside. The arm 53 extends below the ratchet 6 (as seen along the axis of the ratchet) and is connected to it via an articulated connection. To this end the ratchet 6 has a protrusion 66 (or journal) which together with a corresponding opening 54 in the arm 53 forms a mortise and tenon joint, for example. These elements may of course also be arranged in the opposite manner. Depending on the position of the button 51 the opening 54 and thus the protrusion 66 are oriented toward different sides of the ratchet 6—to the left and to the right of the ratchet in FIG. 4—so that the ratchet can be put in one of the two positions A and B (cf. FIGS. 1 and 2). This design of operating the ratchet position via an actuating member 5 which operates as a slide is characterized by the fact that it is particularly robust and reduces the risk of damage due to soiling.

As is also discernible in FIG. 3, the tension device has a braking element 9 which serves as a damping device. The braking element 9 ensures calm retraction of the tension line and prevents a high refraction speed from being reached especially in retraction of a greater line length, which would lead to the risk of injury for the user, e.g., cutting or impact injuries (due to the end of the line).

The braking element 9 has a wheel element in the form of a gear wheel 37 which cooperates with a second gear rim ("braking gear rim") 39 of the winding reel 3. The braking gear rim 39 is designed as an internal ring gear and the brake element 9 is supported in such a way that its axis is eccentric with the winding reel within the extent of the latter such that the gear wheel 37 engages in the braking gear rim 39. Rotation of the winding reel 3 is thus converted into a rotation of the gear wheel 37. The body 38 of the braking element is supported in a recess 34 in the housing bottom 2. Rotation of the gear wheel 37 presents a resistance to the braking element such that it creates a braking effect at a certain speed of the rotation of the roll. The braking effect occurs with movements in both directions, so that excessively rapid unrolling as well as excessively rapid retraction of the tension cable 10 are both decelerated. Additional details and embodiments of this braking element can be derived from European Patent No. EP 1 935 674 A1 by the present applicant, as mentioned above.

A second exemplary embodiment of an inventive tension device 11 is shown in FIGS. 9 to 13. In this implementation the ratchet and the respective gear rim are arranged on the rear side, i.e., on the side of the winding reel facing the bottom part of the housing. The components of the tension device are discussed below for the sake of an overall view, but the differences in comparison with the first exemplary embodiment will not be discussed. Otherwise what was said above regarding the first embodiment also applies here.

FIGS. 9 and 10 give a general view of the design of the tension device 11. The tension device 11 again in this case has a two part housing consisting of a housing bottom 12 and a cover 18 (the cover 18 is removed in FIG. 9). The tension cable 10 is passed through an opening 26 reinforced with a sleeve 19 (one piece here) into the housing to a winding reel 13 onto which the part of the tension cable 10 inside the tension device 11 is rolled.

The winding reel 13 has a gear rim 41 on its body, which serves to wind up the tension cable 10 as a cable roll 42. The cable roll 42 and/or the winding reel 3 is/are prestressed with a spring 14 in the winding direction. The spring 14 is preferably embodied like the spring 4 in the previous exemplary embodiment. Unlike the previous exemplary embodiment, the gear rim 41 is on the side of the winding reel, which faces the housing bottom in the installed state. Thus in the diagram in FIG. 9 the gear rim 41 is concealed by the body of winding reel. Furthermore, the winding reel 3 has a braking gear rim 44 which cooperates with a braking element 9 provided in the tension device 11, which also serves as a damping device in this embodiment.

The gear rim 41 of the winding reel 13 has teeth only in the circumferential sections 43. In other circumferential sections—the gear rim is free of teeth. In the embodiment shown here four sections 43 each with three teeth and four interdental spaces, for example, are provided, each being separated by four "smooth" sections 40 here (cf. FIGS. 11 and 12). Sections 43 are advantageously arranged uniformly on the gear rim.

A ratchet 16 is arranged next to the winding reel 13 in the housing. The ratchet 16 is mounted to rotate about a guide sleeve 17 as in the preceding exemplary embodiment but is oriented "inversely" so to speak due to the arrangement of the winding reel gear rim on the rear side. The ratchet can be moved between two positions A, B each of which is shown in FIGS. 11 and 12, by using the actuating member 15 which has a button 55 that is accessible from the outside and can be operated by means thereof.

With reference to FIG. 11a the ratchet has sloping surfaces, which are used in blocking the extraction of the cable in that they each cooperate with a tooth flank of the gear rim 41. With reference to FIG. 11b the ratchet 16 has two recesses which cooperate with a spring retaining element and the spring holders of the ratchet, each in one of the positions A, B. This design corresponds to the ratchet 16 of the first embodiment (cf. FIG. 5).

As is recognizable on the basis of FIGS. 12 and 13, with the help of the ratchet 16 two positions A, B are implemented, each corresponding to a blocking position and corresponding in function principle and effect to the positions A, B of FIGS. 1 and 2. In each position, the ratchet 16 may assume an end position in which the ratchet engages in the teeth 43 of the gear rim 41; the teeth cooperate on the outside of the ratchet via tooth flanks of one type via one or more of the sloping surfaces 61, 62, 63 corresponding to the tooth flank. With the help of the ratchet 16 the direction in which the cable roll can move is determined while it blocks in the respective opposite direction. Both flanks of the teeth of the gear rim 41—more precisely the toothed sections 43—are utilized for optionally inhibiting the movement of the cable. The teeth may be symmetrical as in the embodiments shown here, which additionally simplifies construction.

The actuating member 15 of the tension device 11 consists essentially of a plate 56 on whose outside the button 55 mentioned above (FIG. 9) is mounted. The actuating member 15 is mounted displaceably through its plate 56 in the housing bottom 12 in an interior space 27, which is provided in the wing part of the tension device and is held there in its position by means of a wire spring 28. On the side of the plate 56 facing inward, a stop face 57, 58 is designed on each end. These cooperate with one arm 29 of the ratchet 16. The actuating member may be pushed to the left or the right by means of the button 55; one of the stop faces 57, 58 then acts on the arm 29 and tilts the ratchet 16 into the respective one of the two positions A and B.

The opening 26 through which the tension cable 10 comes out of the tension device 11 is situated in the tension device 11 in the wing part that is opposite the wing part in which the actuating member 15 and the ratchet 16 are accommodated. This reduces the risk of injuries due to the tension cable 10 for the user in handling of the nonskid chain. Such an arrangement could of course also be selected for the tension device 1 in FIGS. 1 to 3. In fact, it is illuminating that the choice of the location of the opening is independent of whether the gear rim 41 which cooperates with the ratchet 16 is arranged on the front or rear side of the winding reel 13.

While the principles of the invention have been described above in connection with preferred embodiments, it is to be clearly understood that this description is made only by way of example and not as a limitation of the scope of the invention.

The invention claimed is:

1. A tension device for a nonskid chain comprising:
   a housing;
   a winding reel having a gear rim and a tension line which can be retracted into the housing through an opening in the housing and can be connected to the winding reel, the winding reel being mounted to rotate about an axis within the housing and being prestressed in a winding direction, the gear rim having teeth arranged along a circumference of the gear rim and at least one area formed on the circumference of the gear rim which is free of teeth and is situated between the teeth; and
   a ratchet having a first position that blocks rotational movement of the winding reel in a tension direction by engaging at least one of the teeth of the gear rim.

2. The tension device according to claim 1, wherein the at least one area comprises two areas that separate an equal number of toothed sections, each of the toothed sections having a uniform number of toothing pitches.

3. The tension device according to claim 1, further comprising an actuating member which is externally accessible and enables the ratchet to move between the first position and a second position in which rotational movement of the winding reel in the tension direction is enabled, the actuating member including an arm that is coupled to the ratchet by an articulated connection.

4. The tension device according to claim 3, wherein the arm extends along a direction extending around the winding reel, is external to the winding reel, and is located beneath the ratchet when viewed in the direction of the axis of the winding reel.

5. The tension device according to claim 3, wherein the articulated connection is a mortise and tenon joint formed by an opening and a journal engaging in the opening, both being provided on at least one of the ratchet and the arm.

6. The tension device according to claim 1, further comprising an actuating member which is externally accessible and includes two stop faces, wherein the ratchet has an arm located between the two stop faces that can be tilted in response to movement of the actuating member by the stop faces, the tilting of the arm causes the ratchet to move between the first position and a second position in which rotational movement of the winding reel in the tension direction is enabled.

7. The tension device according to claim 3, wherein the ratchet engages the gear rim when the ratchet is in the second position and blocks rotational movement of the winding reel in a winding direction by the engagement of the ratchet in the teeth.

8. The tension device according to claim 6, wherein the ratchet engages the gear rim when the ratchet is in the second position and blocks rotational movement of the winding reel in a winding direction by the engagement of the ratchet in the teeth.

9. The tension device according to claim 1, further comprising a damping device having a wheel element connected to the winding reel via a gear, the dampening device providing a braking effect at least in a direction corresponding to a winding direction of the winding reel, the wheel element comprising a gear wheel which cooperates with the gear rim, the gear rim comprising an internal ring gear of the winding reel.

10. The tension device according to claim 8, further comprising a damping device having a wheel element connected to the winding reel via a gear, the dampening device providing a braking effect at least in a direction corresponding to a winding direction of the winding reel, the wheel element comprising a gear wheel which cooperates with the gear rim, the gear rim comprising an internal ring gear of the winding reel.

11. A nonskid chain for an automotive wheel, having a tension device comprising:
    a housing;
    a winding reel having a gear rim and a tension line which can be retracted into the housing through an opening in the housing and can be connected to the winding reel, the winding reel being mounted to rotate about an axis within the housing and being prestressed in a winding direction, the gear rim having teeth arranged along a circumference of the gear rim and at least one area formed on the circumference of the gear rim which is free of teeth and is situated between the teeth; and
    a ratchet having a first position that blocks rotational movement of the winding reel in a tension direction by engaging at least one of the teeth of the gear rim.

12. The nonskid chain according to claim 11, wherein the tension device can be undisplaceably attached to an outside line of the nonskid chain by hooks arranged on the housing.

* * * * *